United States Patent [19]

Landriault

[11] Patent Number: 4,537,428
[45] Date of Patent: Aug. 27, 1985

[54] JOINT AND JOINT COMPONENTS FOR PIPE SECTIONS SUBJECTED TO AXIAL COMPRESSION LOADS

[75] Inventor: L. Steven Landriault, Houston, Tex.

[73] Assignee: Hydril Company, Los Angeles, Calif.

[21] Appl. No.: 379,814

[22] Filed: May 19, 1982

Related U.S. Application Data

[63] Continuation of Ser. No. 192,436, Sep. 29, 1980, abandoned.

[51] Int. Cl.³ .............................................. F16L 25/00
[52] U.S. Cl. .................................. 285/333; 285/334.4; 285/383; 285/390; 285/397; 285/417
[58] Field of Search ............... 285/333, 334, 383, 390, 285/383, 334.4, 369, 370, 417, 397

[56] References Cited

U.S. PATENT DOCUMENTS

| | | | |
|---|---|---|---|
| 940,733 | 11/1909 | Sands | 285/383 |
| 2,239,942 | 4/1941 | Stone et al. | 285/334.4 X |
| 2,258,066 | 10/1941 | Oyen | 285/390 X |
| 2,574,081 | 11/1951 | Abegg | 285/383 X |
| 3,150,889 | 9/1964 | Watts | 285/334 X |
| 3,572,777 | 3/1971 | Blose | 285/334 |
| 3,989,284 | 11/1976 | Blose | 285/334 X |
| 4,009,893 | 3/1977 | Schutton | 285/334 X |
| 4,161,332 | 7/1979 | Blose | 285/334 |
| 4,373,754 | 2/1983 | Bollfrass et al. | 285/334 |

FOREIGN PATENT DOCUMENTS

| | | | |
|---|---|---|---|
| 635412 | 1/1962 | Canada | 285/333 |
| 7510249 | 3/1977 | Netherlands | 285/334 |
| 508664 | 7/1939 | United Kingdom | 285/390 |
| 596673 | 1/1948 | United Kingdom | 285/383 |
| 757337 | 9/1956 | United Kingdom | 285/334.4 |

*Primary Examiner*—Dave W. Arola
*Attorney, Agent, or Firm*—Dodge, Bush & Moseley

[57] ABSTRACT

Joint and joint components designed to withstand axial compressive loads join a pair of pipe sections end-to-end, the adjacent ends of the sections being threaded. A coupling member for connecting the threaded adjacent ends of the pipe sections includes threads interengaged with the threads on the adjacent ends of the pipe sections. An abutment member located between the outer ends of the pipe sections is shaped so that the ends of the pipe sections abut against opposite sides of the abutment member. Each pipe section includes a shoulder which is formed integral with and extends circumferentially around the section, the shoulder including an angled surface which faces the angled surface on the other pipe section and is oriented at an angle substantially the same as the surfce on the other pipe section, each surface terminating at a circumferential edge which is closer to the edge on the other pipe section than is any other portion of its respective surface. One of the coupling and abutment members includes angled surfaces which approach being complementary to and engaging the surfaces on the pipe sections when the joint is formed and a compressive load is applied, whereby the angled surfaces enhance the load bearing surface area of the pipe sections so that when they are subjected to an axial compression load deformation of the sections is retarded.

9 Claims, 3 Drawing Figures

4,537,428

JOINT AND JOINT COMPONENTS FOR PIPE SECTIONS SUBJECTED TO AXIAL COMPRESSION LOADS

This application is a continuation of application Ser. No. 192,436, filed Sept. 29, 1980 now abandoned.

TECHNICAL FIELD

The subject invention relates to pipe joints and joint components and, in particular, to such configurations which are useful in connecting adjacent ends of two pipe sections which are designed so that the load bearing surfaces of the pipe sections subjected to axial compression loads are enhanced for retarding radial deformation of the sections.

There are many oilfield applications where pipe sections are placed in a high state of axial compression which approaches the rated ability of the pipe sections to withstand such force. However, when pipe and other objects are subjected to axial compression, they have a tendency to expand radially which is known as Poisson's effect and deform.

This problem is exacerbated at a joint between adjacent pipe sections where interengaged threads operate to distribute induced axial compression loads through tapered surfaces of the thread elements. These tapered surfaces tend to combine cumulatively with Poisson's effect which results in a reduction in the effective stability at the joint when it is subjected to compression loading.

Thus, it is of a significant advantage to provide a means for dissipating the compression loading on pipe sections at a joint which is subjected to axial compression approaching the rated ability of the pipe to withstand such forces.

DISCLOSURE OF THE INVENTION

A joint and joint components have been developed in accordance with the invention where pipe sections which are joined together are designed so that the ability of the pipe sections to carry axial compression loads is increased. The axial compression load is distributed within the portion of the pipe sections which form the joint through angled surfaces which operate to increase the available section area subjected to axial compression loads. The additional areas operate to dissipate the load and restrict the natural tendency of the materials to expand radially by distributing the axial load into axial and radial load vectors. In this way radial expansion is retarded and the ability of the joint to withstand compression loading increased.

The joint and joint components which achieve these results operate to join in a pair of pipe sections arranged end-to-end, the adjacent ends of the sections being threaded either on their outer or inner surfaces so that the ends of the sections can be either pin or box portions of the joint. A coupling member connects the threaded ends of the adjacent pipe sections, the coupling member including threads appropriately located which interengage with the threads on the adjacent ends of the pipe sections. An abutment member which is either formed independent of or integral with the coupling member is positioned between the outer ends of the pipe section, the abutment member being shaped so that the ends of the pipe sections abut against opposite sides of the abutment member.

Each pipe section includes a shoulder with an angled surface, the shoulders being formed integral with and circumferentially around their respective sections. The angled surface on each shoulder is oriented at an angle substantially the same as the orientation angle of the similarly shaped surface on the other pipe section when the joint is formed. Each angled surface terminates at a circumferential edge which is closer to the edge of the angled surface on the other pipe section than is any other portion of the angled surface when the joint is formed.

Either the coupling member or abutment member also includes angled surfaces which are complementary to and are paired with the angled surfaces on the pipe sections. Although there might be applications where the surfaces are in fact formed to be complementary prior to loading, the respective surfaces which together form each pair of complementary angled surfaces are preferably formed at angles which are not exactly complementary so that a small gap is formed at either the inner or outer ends of the surfaces, depending on the application, when they are initially brought together and before a compressive load is applied. The surfaces are formed at suitable angles so that when the predicted compressive load is applied the surfaces deform slightly and approach a complementary relationship. This arrangement causes an uneven load across the surfaces and can be utilized to enhance pressure integrity of the joint. A 1°±1° variance in the surfaces from being complementary before a load is applied can usually produce these results. When the joint is formed, engagement of the angled surfaces operates to enhance the load bearing area of the pipe sections so that when they are subjected to high axial compression loading the load is dissipated and deformation of the pipe sections is retarded.

BRIEF DESCRIPTION OF THE DRAWINGS

A better understanding of the invention can be obtained when the detailed description of preferred embodiments set forth below is considered in conjunction with the accompanying drawings, in which.

DETAILED DESCRIPTION OF PREFERRED EMBODIMENTS

Figure 1:
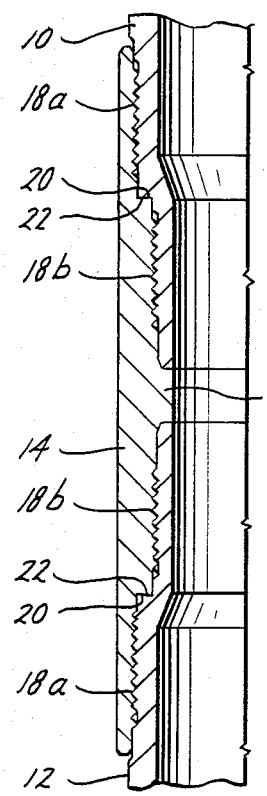
FIG. 1 is a partial sectional view of one embodiment of the joint and joint components where the pipe sections and coupling member are joined through a stepped-threaded configuration and the angled surfaces are formed between adjacent groups of threads.
Figure 2:
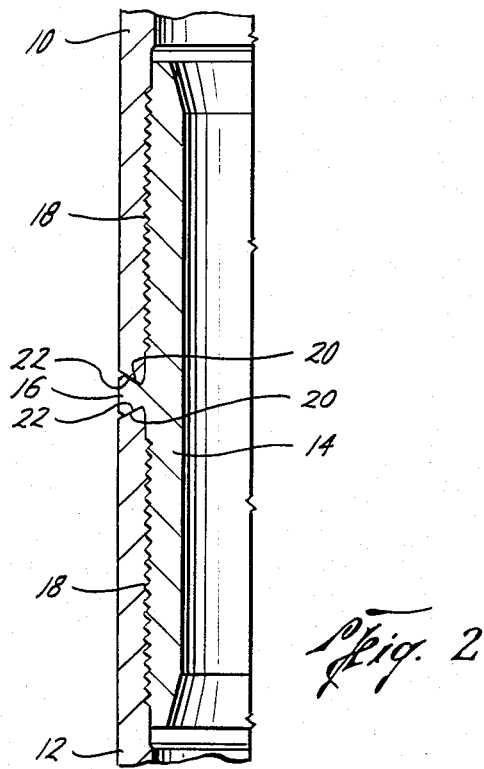
FIG. 2 is a second embodiment of the pipe joint and joint components where the ends of the pipe sections are threaded on their inner surfaces and the coupling is threaded on its outer surface, the angled surfaces being formed on the outer ends of the respective pipe sections and engaging an abutment member formed integral with the coupling.
Figure 3:
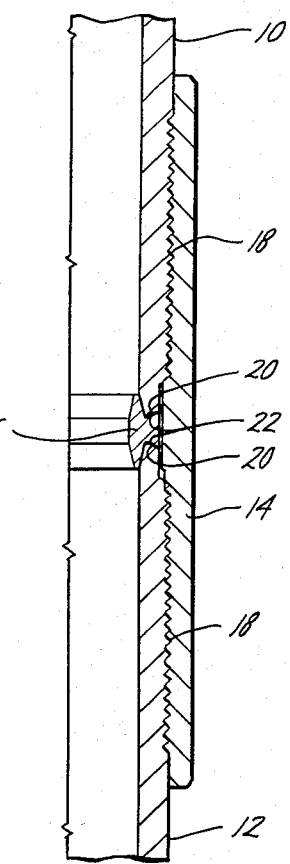
FIG. 3 is a sectional view of a third embodiment of the joint and joint components where the pipe sections are threaded on their outer surfaces and the abutment member is formed separate from the coupling, the angled surfaces being formed on the outer end of the pipe sections and engaging the abutment member.

FIGS. 1, 2 and 3 illustrate three different embodiments of the invention. Each of the embodiments schematically illustrates the threaded connection between adjacent pipe sections and a coupling member. The invention can be used in conjunction with any joint between elements loaded in compression and has particular applicability to a joint which uses conventional, truncated, cylindrical non-interference threads which are typically used in oilfield applications, even though non-truncated threads are shown schematically in FIGS. 1-3. Examples of such threaded connections are shown in U.S. Pat. Nos. 3,989,284 and 4,161,332, which are both owned by the company which owns the subject invention. The subject matter of both patents are incorporated by reference as though they were fully set forth. Reference to these two patents should not be construed as limiting the types of threads to which the invention may be applied since other suitable thread configurations can also be used in conjunction with the invention.

Referring specifically to FIG. 1, reference numerals 10 and 12 are used respectively to refer to a pair of upper and lower pipe sections which are arranged end-to-end and reference numeral 14 to a coupling which operates to join the sections 10, 12 together. An abutment member 16 is formed integral with the coupling 14 and is located between the outer ends of the pipe sections 10, 12, the abutment member 16 being shaped so that the ends of the pipe sections abut against opposite sides of the abutment member.

In the embodiment of the invention shown in FIG. 1, the adjacent ends of the pipe sections 10, 12 are the pin portions of the joint which means that they are threaded on their outer surfaces. The coupling 14 operates as a box for each of the pins and is threaded on its inner surface. The threads on the pipe sections 10, 12 and the coupling 14 are interengaged as illustrated by the broken lines referred to by reference numerals 18a and 18b. The threads in this embodiment can, for example, be similar to the ones shown in U.S. Pat. No. 4,161,332 mentioned above which are known as two-stepped threads which include first and second pairs of interengaged threads on the boxes and pins, the first pair of threads being axially and radially spaced from the second pair of threads.

Each pipe section 10, 12 is formed with a shoulder 20 which extends circumferentially around the respective pipe sections. Each shoulder includes an angled surface which is oriented at an angle substantially the same as the similarly located surface on the other pipe section. As is also shown in FIG. 1, the angled surfaces face each other when the joint is formed and each angled surface terminates at a circumferential edge that is located closer to the edge of the angled surface on the other pipe section than is any other portion of the angled surface. It should be noticed that in this embodiment of the invention the shoulder 20 is formed on each pipe section 10, 12 between the first and second pairs of threads 18a, 18b. The shoulders 20 are shown as being formed at equal distances along their respective pipe sections which is preferred, but there are applications of the invention where the shoulders could be formed at unequal distances.

The inner surface of the coupling 14, between the respective adjacent pairs of threads 18a, 18b, includes shoulders 22 with angled surfaces that are shown as complementary to the similarly located angled surfaces of the shoulders 20 on the respective pipe sections 10, 12. Although there might be applications where the surfaces are in fact formed to be complementary prior to loading, the respective surfaces which together form each pair of complementary angled surfaces are preferably formed at angles which are not exactly complementary so that a small gap is formed at either the inner or outer ends of the surfaces, depending on the application, when they are initially brought together and before a compressive load is applied. The surfaces are formed at suitable angles so that when the predicted compressive load is applied the surfaces deform slightly and approach a complementary relationship. This arrangement causes an uneven load across the surfaces and can be utilized to enhance pressure integrity of the joint. A 1°±1° variance in the surfaces from being complementary before a load is applied can usually produce these results.

The shoulders 20 and 22 and, in particular, the angled surface portions which engage each other operate to enhance the section area of the pipe sections so that when the latter are subjected to an axial compression load the force is distributed both axially and radially for retarding deformation of the pipe sections 10, 12. As mentioned above, when axial force is applied which approaches the rated capacity of the pipe sections, the ability of the joint to distribute the axial load reduces the natural tendency of the pipe sections to expand and increases the stability of the joint.

In a second embodiment of the invention shown in FIG. 2 the adjacent ends of the pipe sections 10, 12 are threaded on their inner surfaces so they form the box portions of the joint while the coupling 14 forms the pin portions of the joint by having threads on its outer surface which interengage with the threads on the pipe sections 10, 12 as indicated by the broken lines referred to by reference numeral 18. These threads, for example, can be of the type shown in U.S. Pat. No. 3,989,284 mentioned above.

An abutment member 16 is formed integral with the coupling 14 and is located between the outer ends of the pipe sections 10, 12 and is shaped so that the ends of the pipe sections abut against opposite sides of the abutment member 16.

The shoulders 20 formed on the pipe sections 10, 12 are formed on the outer ends of the respective pipe sections and include angled surfaces that are shown engaging complementary angled surfaces on shoulders 22 formed on the respective sides of the abutment member 16. As is the case with the shoulders 20 of the embodiment shown in FIG. 1, the engaging surfaces can be formed slightly non-complementary and designed to approach a complementary relationship when loaded. The angled surfaces of the shoulders 20 of this embodiment also include terminate at respective circumferential edges, each of which is closer to the edge of the surface on the other pipe section than is any other portion of its respective surface.

The embodiment shown in FIG. 3 illustrates the pipe sections 10, 12 as threaded on their outer surfaces so that they form the pin portions of the joint while the coupling 14 includes threads on its inner surface to form the box portions, the threads on a box and pin being interengaged as illustrated by the broken lines referred to by reference numeral 18 for forming the joint. The threads in this embodiment of the invention can be formed similar to those mentioned in conjunction with FIG. 2.

It should be noted that the abutment member 16 is formed independent of the coupling 14 instead of being formed integral with the coupling 14 as shown in the preceding two embodiments. The shoulders 20 are formed on the outer ends of the pipe sections 10, 12 and engage complementary shoulders 22 on the abutment member 16 with the same relationship described above for the other two embodiments. The shoulders 20 include angled surfaces which terminate at circumferential edges which are closer to the edge of the surface on the other pipe section than any other portion of the angled surface.

It can be seen for each of the embodiments described in detail above that the joints are formed of component parts specifically designed for use in such a joint. These parts include the particularly shaped ends of the pipe sections 10, 12, couplings 14 which have shoulders that complement and interfit with cooperating shoulders on the pipe sections 10, 12, and an abutment member 16 which can be formed independent of the coupling 14 and include shoulders similar to these described above. Thus, the invention is contemplated as including each of the individual components capable of being used in the described joint as well as the overall joint itself.

Thus, in accordance with the invention, as illustrated in three separate embodiments, a joint and joint components are provided which operate to enhance the available section area of adjacent pipe sections so that when the sections are subjected to axial compression loads the tendency of the pipe sections to deform radially is retarded by distributing the compression load into both axial and radial components. The invention therefore operates to dissipate the compressive load and retard deformation of the pipe section so that the sections can be loaded with greater stability near the upper rating of the sections.

The foregoing disclosure and description of the invention are intended to be illustrative and explanatory, and various changes in the size, shape and materials as well as in the details of the illustrated construction may be made without departing from the spirit of the invention. All such changes are contemplated as falling within the scope of the appended claims.

What is claimed is:

1. Joint for axially compressive loaded pipe sections, comprising:
   (a) a pair of pipe sections arranged end-to-end, the adjacent ends of the sections being threaded, said threads of the pipe sections being formed in two groups, the threads in one group being spaced radially and axially from the threads in other group, said threads including cylindrical, non-interference threads;
   (b) a coupling member for connecting the threaded adjacent ends of the pipe sections, the coupling member including threads on each of its ends interengaged with the threads on the adjacent ends of the pipe sections, the threads on each end of the coupling member being formed in two groups, the threads in one group being spaced radially and axially from the threads of the other group, said threads including cylindrical non-interference threads;
   (c) an abutment member located between the outer ends of the pipe sections, the abutment member being shaped so that the ends of the pipe sections abut against opposite sides of the abutment member;
   (d) each pipe section including a shoulder formed integral with and extending circumferentially around the section between the groups of threads, the shoulder including an angled surface which faces the angled surface on the other pipe section and is oriented at an angle substantially the same as the surface on the other pipe section, each surface terminating at a circumferential edge which is closer to the edge on the other surface than is any other portion of its respective surface;
   (e) the coupling member including angled surfaces between each of said groups of threads which approach being complementary to and engaging the surfaces on the pipe sections when the joint is formed and a compressive load is applied wherein a gap is formed at either the inner or outer ends of the unequal angled surfaces on the coupling member and the pipe section when the surfaces are initially brought together and before the compressive load is applied; and
   (f) whereby the angled surfaces between the thread groups of the pipe section and the coupling member enhance the load bearing surface area of the pipe sections so that when they are subjected to an axial compressive load, deformation of the sections is retarded so that the section can be loaded with greater stability near the upper rating of the section, and whereby providing the surfaces to have unequal angles which approach being complementary on full compressive loading of the joint enhances the pressure integrity of the joint because of the unequal load distribution across the surfaces.

2. The joint of claim 1, wherein the pipe sections are threaded on their outer surfaces and the coupling member is threaded on its inner surface.

3. The joint of claim 1, wherein the pipe sections are threaded on their inner surfaces and the coupling member is threaded on its outer surface.

4. The joint of claim 1, wherein the abutment member is formed integral with the coupling member.

5. The joint of claim 1, wherein the abutment member and coupling member are formed as separate elements.

6. The joint of claim 1, wherein the angled surfaces which approach being complementary when a compressive load is applied are formed about one degree plus one degree or minus an angular amount less than one degree of being complementary prior to application of a compressive load.

7. The joint of claim 1, wherein the shoulders are formed at equal distances along their respective pipe sections.

8. Joint for axially compressive loaded pipe sections, comprising:
   (a) a pair of pipe sections arranged end-to-end, the adjacent ends of the sections being threaded wherein the threads are formed in two groups, the threads in one group being spaced radially and axially from the threads in the other group;
   (b) a coupling member for connecting the threaded adjacent ends of the pipe sections, the coupling member including threads interengaged with the threads on the adjacent ends of the pipe sections;
   (c) each pipe section including a shoulder formed between said groups of threads and formed integral with and extending circumferentially around the section, the shoulder including an angled surface which faces the angled surface on the other pipe section and is oriented at an angle substantially the same as the surface on the other pipe section, each surface terminating at a circumferential edge which is closer to the edge on the other surface than is any other portion of its respective surface;
   (d) the coupling including angled surfaces which approach being complementary to and engaging the surfaces on the pipe section when the joint is formed and a compressive load is applied so that a gap is formed at either the inner or outer ends of the unequal angled surfaces when the surfaces are initially brought together and before a compressive load is applied; and (e) whereby the angled surfaces enhance the load bearing surface area of the pipe sections so that when they are subjected to an axial compression load, deformation of the sections is retarded so that the section can be loaded with greater stability near the upper rating of the section, and whereby providing the surfaces to have unequal angles which approach being complementary on full compressive loading of the joint enhance the pressure integrity of the joint because of the unequal load distribution across the surfaces.

9. Joint for axially compressive loaded tubular members, comprising:

(a) a first tubular member having a threaded end with threads formed in two groups, the threads in one group being spaced radially and axially from the threads in the other group;

(b) a second tubular member having a threaded end with threads formed in two groups which are interengagable with with said threads on the first tubular member;

(c) each tubular member including a shoulder formed between said groups of threads and formed integral with and extending circumferentially around the tubular member, the shoulder of the first tubular member including an angled surface which faces an angled surface on the shoulder of the second tubular member, the angled surfaces of the shoulders of the first and second tubular members being unequal such that before makeup of said tubular members, each of said angled surfaces of the shoulders of the first and second tubular member terminate at a circumferential edge which is closer to the edge on the other surface than is any other portion of its respective surface;

(d) whereby, when the first tubular member and second tubular member are initially brought together and before a compressive load is applied, a gap is formed at the inner or outer ends of said unequal angled surfaces, and when the joint is formed and a compressive load is applied, the angled surfaces approach being complementary to each other; and (e) whereby the angled surfaces enhance the load bearing surface area of the tubular members so that when they are subjected to an axial compression load, deformation of the tubular members is retarded so that the tubular members can be loaded with greater stability near the upper rating of the tubular members, and whereby providing the surfaces with unequal angles which approach being complementary on full compressive loading of the joint enhances the pressure integrity of the joint because of the unequal load distribution across the surfaces.

* * * * *